April 16, 1929.　　A. M. STANLEY ET AL　　1,708,977
ELECTRIC WELDING MACHINE
Original Filed Nov. 25, 1921　　11 Sheets-Sheet 1

April 16, 1929.   A. M. STANLEY ET AL   1,708,977
ELECTRIC WELDING MACHINE
Original Filed Nov. 25, 1921   11 Sheets-Sheet 7

April 16, 1929.  A. M. STANLEY ET AL  1,708,977
ELECTRIC WELDING MACHINE
Original Filed Nov. 25, 1921    11 Sheets-Sheet 9

Witness
M. G. Crozier

Inventors
Arthur M. Stanley
James E. Sims
by their attorneys
Van Everen Fish Hildreth & Cary April 16, 1929.  A. M. STANLEY ET AL  1,708,977
ELECTRIC WELDING MACHINE
Original Filed Nov. 25, 1921   11 Sheets-Sheet 10

Witness

Inventors
Arthur M. Stanley
James E. Sims
by their attorneys
Van Everen Fish Hildreth & Cary April 16, 1929.   A. M. STANLEY ET AL   1,708,977
ELECTRIC WELDING MACHINE
Original Filed Nov. 25, 1921   11 Sheets-Sheet 11

Patented Apr. 16, 1929.

1,708,977

UNITED STATES PATENT OFFICE.

ARTHUR M. STANLEY, OF LYNN, AND JAMES E. SIMS, OF QUINCY, MASSACHUSETTS, ASSIGNORS TO STANLEY STEEL WELDED WHEEL CORPORATION, OF BOSTON, MASSACHUSETTS, A CORPORATION OF DELAWARE.

ELECTRIC WELDING MACHINE.

Application filed November 25, 1921, Serial No. 517,459. Renewed June 2, 1928.

This invention relates to a welding machine and more particularly to a machine for automatically butt-welding the hub sections of a steel vehicle wheel.

The object of the invention is to provide a machine for automatically butt-welding the hub sections of a steel vehicle wheel in an advantageous and economical manner.

With this general object in view one feature of the invention resides in the provision of mechanism for automatically handling the wheel sections to be welded to position such sections with relation to welding electrodes and in the automatic operation of the electrodes for accomplishing the desired welding operation. Another feature of the invention resides in the construction and mode of operation of the electrode operating mechanism by which the welding operation is performed in a uniform manner irrespective of variations in the size and construction of the sections of the wheel to be welded.

Other features of the invention reside in the combinations and arrangements of parts of the machine, as will be hereinafter described and particularly pointed out in the claims.

The drawings illustrate a machine for automatically butt-welding the hub sections of a steel vehicle wheel of the type disclosed in the Stanley Patent No. 1,168,222, dated January 11, 1916. In the preferred manner of manufacture of such wheels the spokes of each half of the wheel are welded to their respective hub flanges before the hub sections are butt-welded. The spokes may be thus welded to the hub flanges by a machine of the construction illustrated and described in an application for U. S. Letters Patent filed by us on even date herewith. After the hub sections have been butt-welded the spokes and the rim sections themselves are welded in the manner described in said application to form the completed wheel.

In the drawings illustrating the preferred embodiment of the invention Fig. 2 is a plan view of the machine; Fig. 7ª is a partial section of same, showing collars adapted for rear hub section; Fig. 18 is a detail of the Geneva drive for the drum; Fig. 19 is a detail of the Geneva drive for the electrode cams.

Referring to the drawings the machine illustrated therein comprises in general a plurality of wheel holding jigs mounted upon disks arranged to rotate in a vertical plane. The two sections of the wheel to be welded are assembled in one of the jigs and the latter is thereafter automatically moved into a position to be acted upon by welding electrodes. The welding electrodes are arranged to be moved toward one another and to extend into the interior of the hub of the wheel. Provision is made for mechanically operating the electrodes to grip the interior of the hub of the wheel and for causing the welding current to flow for a sufficient period of time only to form a butt-weld of a desirable character. After the welding operation has been performed the welding electrodes are withdrawn from the hub section and the wheel holding jig is automatically moved into a position in which the welded wheel is removed from the jig.

Provision is made, as will be described, for automatically pressing the hub sections of the wheel toward one another in order to upturn the desired flash during the welding of the metal. This is preferably accomplished through the electrode operating mechanism, as will be described.

Provision is also made for compensating for small variations in the lengths of the hub sections in order that welded wheels of standard length of hub may be automatically produced.

Figure 3:
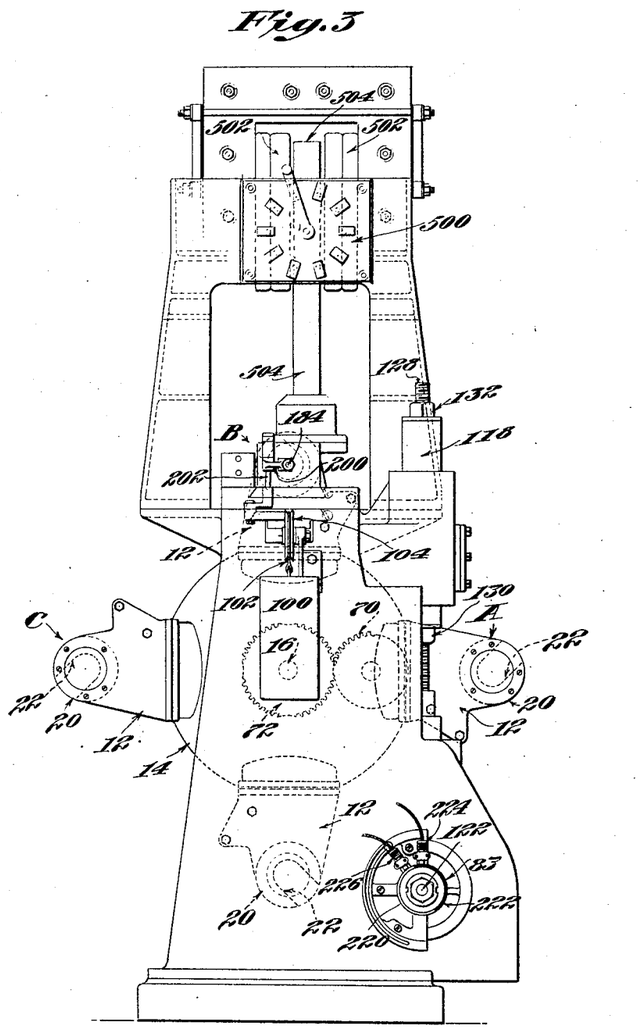
Fig. 3 is a left end elevation of the machine.
Figures 6, 10:
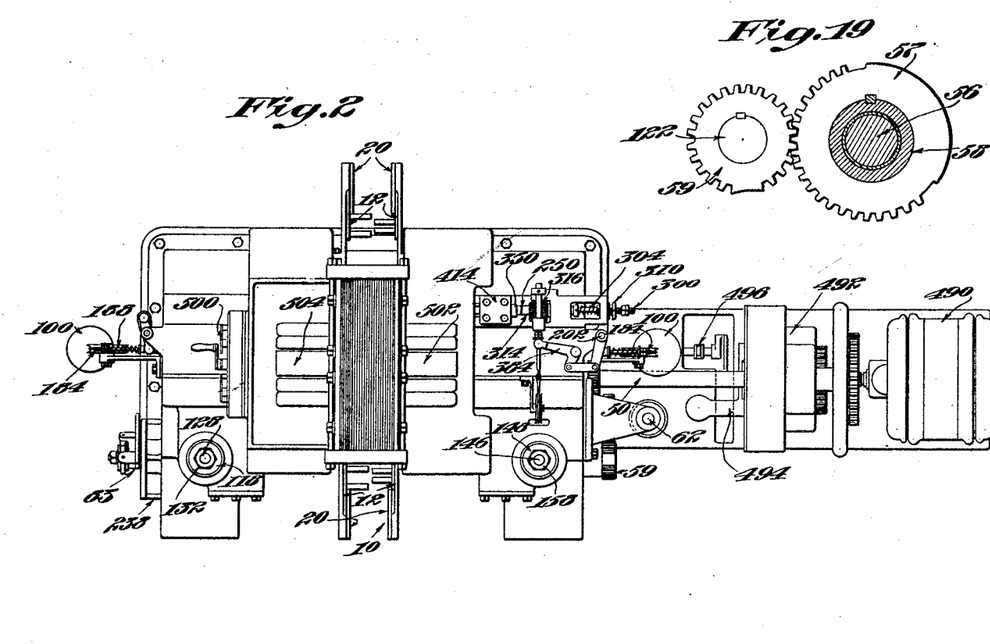
Fig. 6 is a detail of the drum and wheel positioning members in elevation.
Fig. 10 is an end elevation of electrode mountings.
Figure 6:
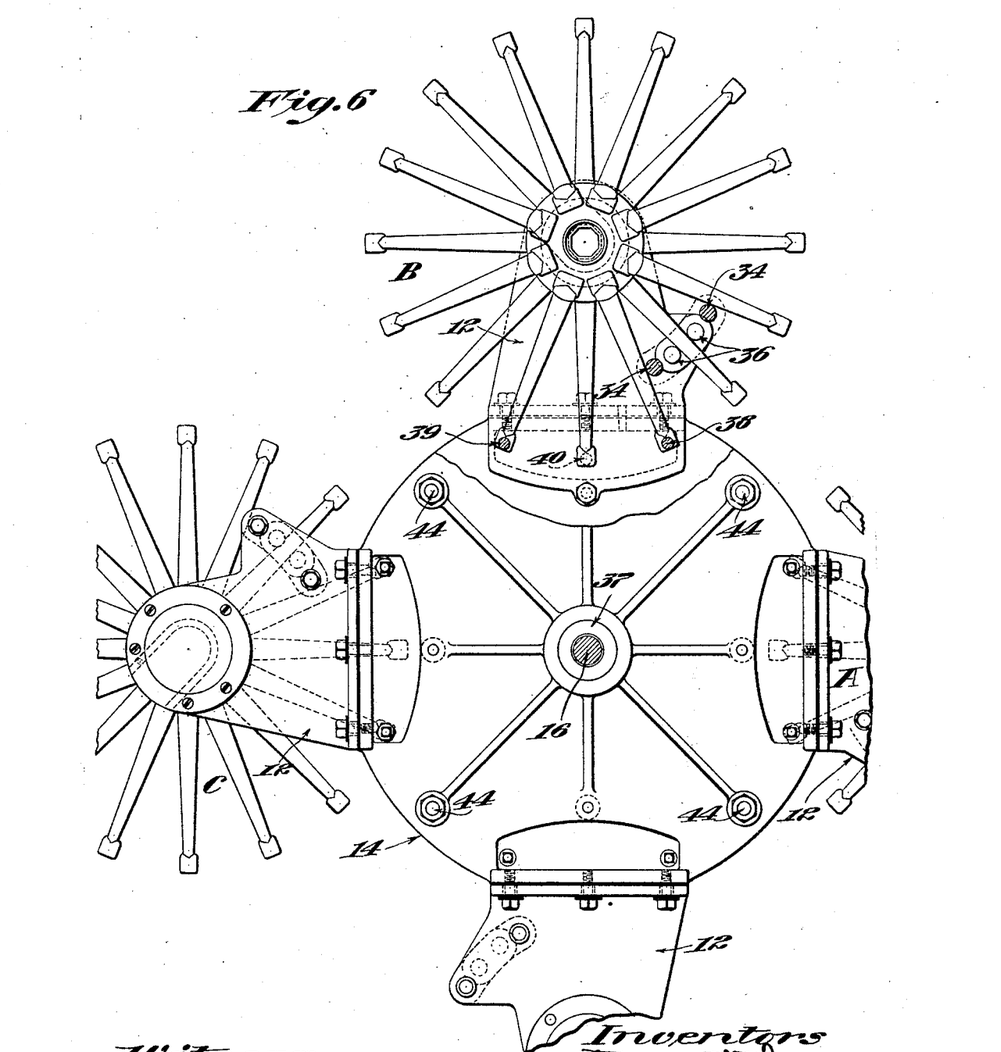
Figure 7:
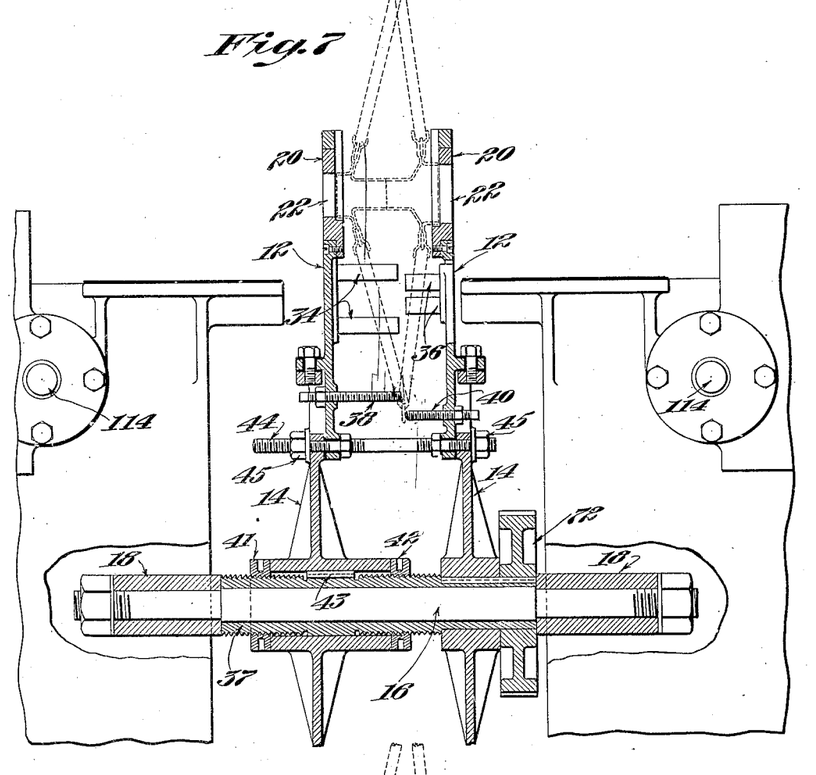
Fig. 7 is a sectional elevation of the devices shown in Fig. 6.
Figure 7A:
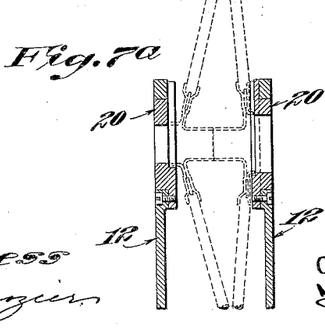

Referring to the drawings, the wheel holding jigs 10 each comprise a pair of brackets 12 bolted to and insulated from disks 14, as shown in Figs. 6 and 7. The disks 14 are mounted upon a supporting shaft 16 fixed in lugs 18 in the machine frame. Each bracket 12 is provided with a collar 20, preferably of copper, having an open radial slot 22 for the reception of the ends of the hubs of each half of the wheel. The collars 20 are screwed to the brackets 12. The shape of the collars 20 for use in connection with the front wheels of a motor vehicle are shown in Fig. 7, while Fig. 7a shows the arrangement for the rear wheels. In the assembling position A, see Fig. 3, the open ends of the slots 22 extend upwardly and to the right, viewing Fig. 3, so that when the sections of the wheel to be welded are assembled in the jig, the weight of the wheel serves to retain the wheel section in the slots. After the wheel holding jig has been turned into the welding position B the open ends of the slots extend upwardly to the left, so that the weight of the wheel serves to retain it in the slots. Finally after the jig has been turned into the unloading position C the slots extend in a direction to permit the welded wheel to be readily withdrawn therefrom.

In order to position the wheel sections within the wheel holding jig so as to maintain the peripheral portions of each in the same desired relation to one another during the welding operation, retaining pins 34, 36 are provided. One set of retaining pins 34 extend from one bracket 12 and are arranged to engage the adjacent surfaces of alternate spokes, as shown in Fig. 6, and the second set of retaining pins 36 embrace the intermediate spoke. The wheel sections are positioned so as to maintain the ends of the spokes of each in a single plane by adjacent screws 38, 39 and 40, two of which extend from one of the brackets 12 and engage the flattened end portions of alternate spokes, while the third adjusting screw extends from the second bracket 12 and engages the opposite side of the intermediate spoke.

The distance between the brackets 12 and supporting disks 14 determines the width of the wheel hub, and in order that wheels having hubs of different widths may be welded in the present machine, provision is made for adjustably varying the relative position of the disks 14. To this end one of the disks 14 (see Fig. 7) is secured to a sleeve 37 through which the shaft 16 is extended by a key 43 arranged to permit the disk to slide lengthwise of the sleeve, and in order to secure the disk in adjusted position upon the sleeve, spanner nuts 41, 42 are arranged to abut the ends of the hub of the disk 14, being screwed upon threaded portions of the sleeve. The second disk 14 is keyed directly to the sleeve. Reenforcing stay bolts 44 are provided at a plurality of points in the periphery of the disks 14, the stay bolts being extended through the disks and having lock nuts 45 engaging the opposed outer surfaces of the disks.

Figure 13:
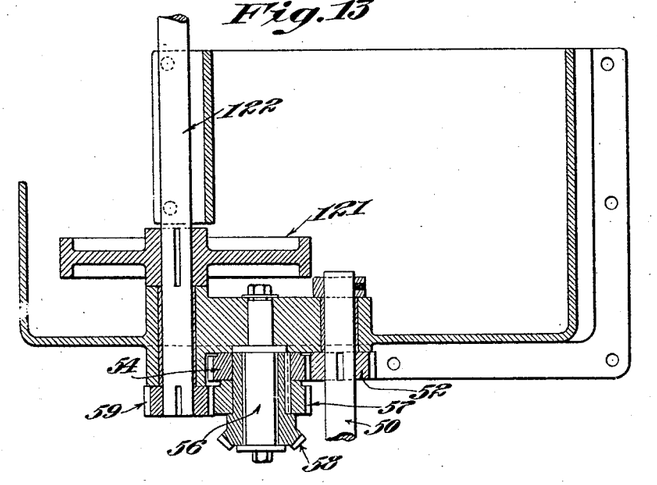
Fig. 13 is a sectional detail of drive on the line 13—13 of Fig. 4.

During the operation of the machine the wheel holding jigs 10 are intermittently rotated through successive steps of 90 degrees each, about the shaft 16, and for this purpose the revolutions of the main driving shaft 50 (see Figs. 5 and 13) driven from a suitable source of power, as will be described, are transmitted to the sleeve 37 upon which the wheel holding jigs are mounted, through spur gears 52, 54, the latter being mounted upon the intermediate shaft 56, through the beveled gears 58, 60, through a vertical shaft 62 and a second set of beveled gears 64, 66 to a second intermediate shaft 68. The revolutions of the intermediate shaft 68 are intermittently transmitted to the sleeve 37 through Geneva gears 70, 72, the latter being keyed directly to the sleeve beyond the stationary disk 14, as shown in Fig. 7. The design of the Geneva gears, as illustrated in Fig. 18, is such as to produce the intermittent rotations of the wheel holding jigs through successive angles of 90 degrees each. The Geneva gears also operate to afford a period of dwell after each advance of the wheel holding jigs to afford opportunity for the welding operations to be performed. Furthermore, the Geneva gears operate to lock the wheel holding jigs during such period of dwell.

Figure 9:
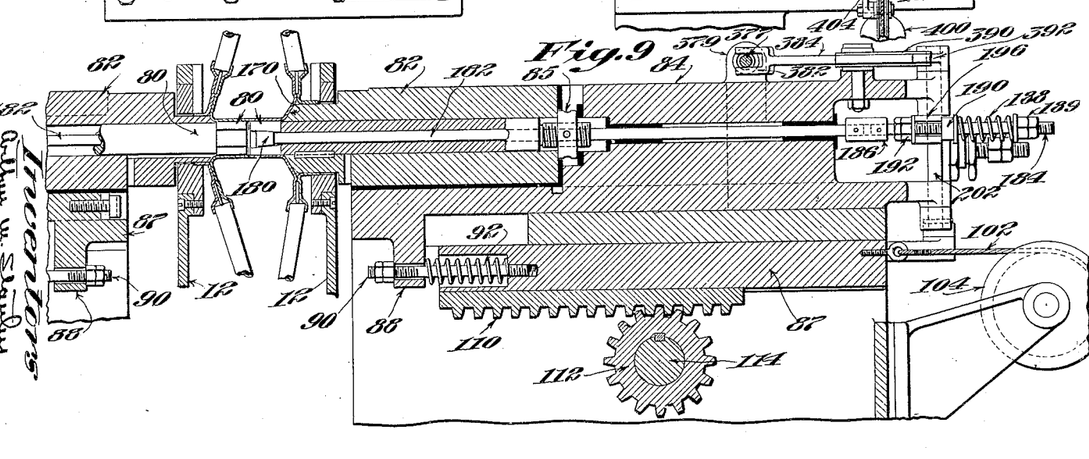
Fig. 9 is a vertical longitudinal section through the same taken on the line 9—9 of Fig. 8.
Figure 10:
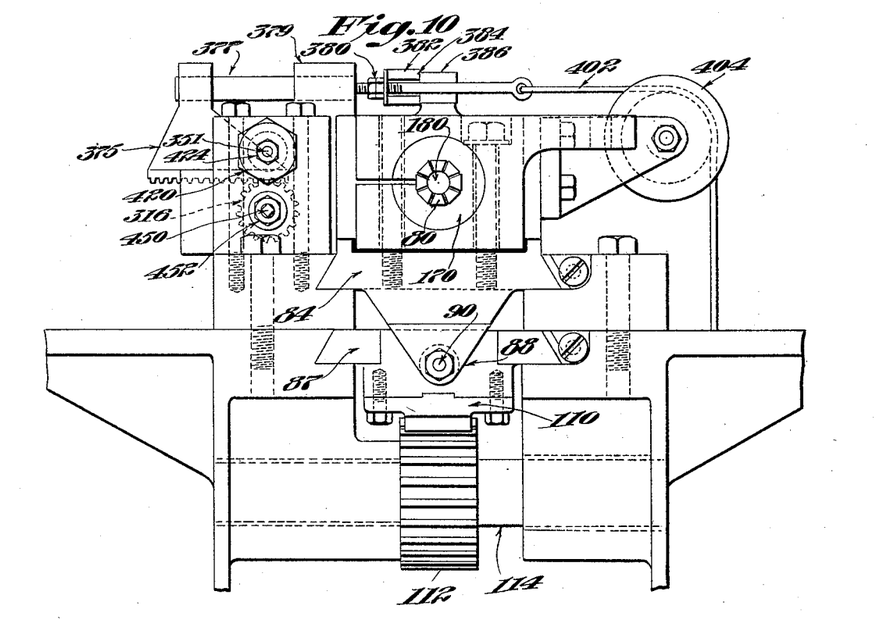

After the wheel sections have been assembled in one of the wheel holding jigs in position A (see Fig. 3) the wheel holding jigs and wheel sections are advanced into position B in which the welding operations are performed. After the wheel sections have arrived in welding position, internal electrodes 80 are moved toward each other through the opposed hub sections and into the interior thereof. Each internal electrode 80 is mounted in an electrode holder 82 secured in and insulated from an upper reciprocating carriage 84. The electrodes 80 are adjustable with relation to the electrode holders 82, and for this purpose spanner nuts 85 are screwed onto the threaded ends of the electrodes, as shown in Fig. 9. The upper carriages 84 slide in ways in the machine frame, and provision is made for moving the carriages to move the electrodes into an operative position within the hub sections of the wheel in timed relation to the movements of the wheel holding jigs, so that after a wheel holding jig has moved into welding position the electrodes 80 are immediately moved into the interior of the hub sections of the wheel. Accordingly, the upper carriages 84 are provided with depending lugs 88, having holes through which bolts 90 are extended, the latter being threaded into the end portions of lower carriages 87 also mounted to slide in ways in the machine frame. A coiled spring 92 embraces each bolt being received within a cylindrical recess in the end portion of each lower carriage 87 and one end of each spring abuts a depending lug 88, and the second end abuts the second carriage. Stop nuts are provided upon the inner end of the bolts 90 and serve to afford an initial adjustment of the relative position of the upper and lower carriages. Both carriages are moved into an inoperative position by a weight 100 connected by a flexible cable 102 running over an idler pulley 104 to the lower carriage 87, so that during the movement of the wheel holding jigs from one position to another the electrodes 80 and both carriages 84, 87 are bodily moved into an inoperative position under the influence of the weight, controlling cams, as will be described, permitting the weight to operate at such times.

Figures 1, 16:
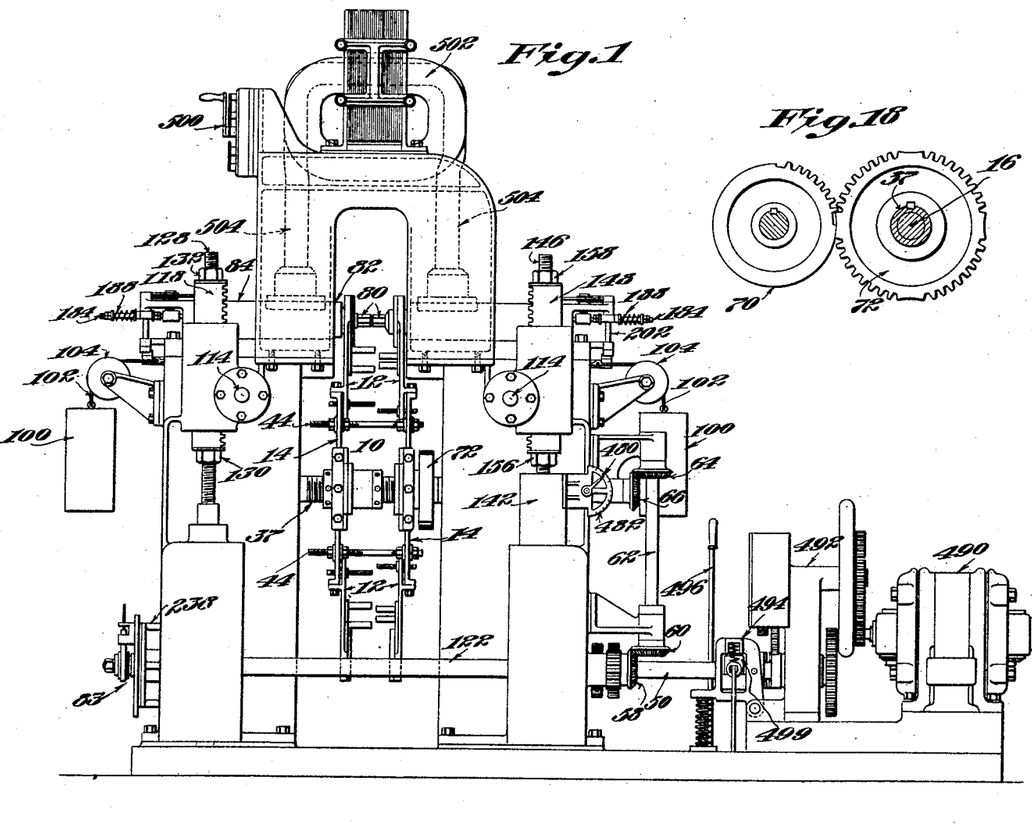
Figure 1 is a front elevation of the machine.
Fig. 16 is a comparative detail of electrode controlling cams.
Figure 15:
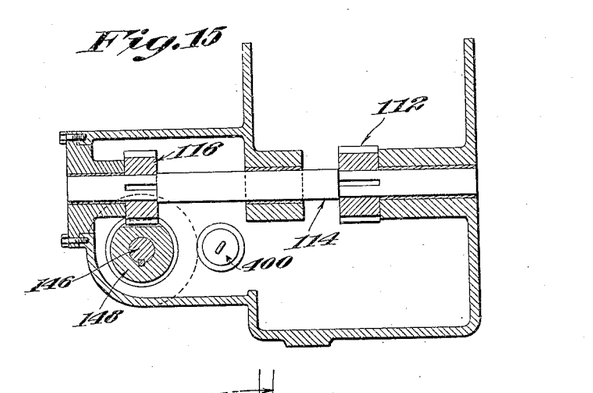
Fig. 15 is a sectional detail of rack and pinion of electrode control on the line 15—15 of Fig. 4.
Figure 16:
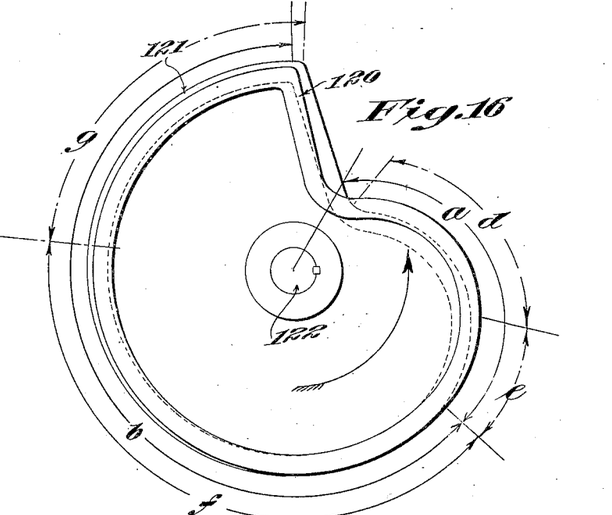

In order to move the electrodes 80 from their inoperative position into the interior of the hub sections of the wheel, the lower carriages are provided with racks 110 with which pinions 112 cooperate. The pinions 112 are mounted upon a counter shaft 114 (see Fig. 15) journaled in the machine frame. A second pinion 116, also mounted upon the shaft 114, engages vertical racks 118, 148 (see Fig. 5). The vertical racks 118, 148, are reciprocated by controlling cams 120, 121, mounted upon a cam shaft 122. The movements of the cam 120 are transmitted to the rack 118 through a cam roll 124 journaled in a yoke 126 through which a rod 128 is extended. The rod 128 extends through a longitudinal hole in the rack 118, and stop washers and nuts 130, 132 adjustably secure the rack in fixed relation to the rod. The yoke 126 is secured to the rod 128 by a key 134 and nut 136 pinned to the lower end thereof. The design of the cam 120 is illustrated in Fig. 16, and from an inspection of Fig. 16 it will be apparent that as the cam roll 124 passes in contact with a portion of the cam "a" the cam roll is lifted, and this movement is transmitted through the rack and pinions to one electrode 80 causing the latter to move inwardly into the interior of the hub to a predetermined position. Further movement of the cam 120 operates to hold the electrode in this fixed position, a portion "b" of the cam being concentric.

The movements of the second controlling cam 121 are transmitted to the second internal electrode 80 by a cam roll 140 journaled in a sleeve 142 within which a heavy coiled spring 144 is received. The coiled spring 144 embraces a portion of a rod 146 the upper end of which is extended through a longitudinal hole in a rack 148. Stop nuts and washers 156, 158 adjustably secure the rack in fixed relation to the rod. The upper end of the coiled spring 144 abuts a washer 150 adjustably secured in fixed relation to the rod 146 by a stop nut 152. The washer 150 comprises a portion of a pressure indicating mechanism to be described. A lock nut 154 is pinned to the end of the rod 146. The design of the cam 121 is illustrated in Fig. 16, and it will be observed that as the cam roll 140 rides upon the portion "d" of the cam, illustrated in dotted lines, the electrode 80 is moved into the interior of the hub of the second wheel section, and until the inclined shoulder 170 upon the electrode holder 82 engages the corresponding inclined portion of the hub, as illustrated in Fig. 9.

As the cam roll 140 rides over the portion "e" of the cam 121 the lower carriage 87 moves relatively to the upper carriage 84 until the end of the carriage 87 is brought into engagement with the depending lug 88. As the cam roll continues around on the portion "f", the gradually increasing eccentricity of the cam 121 serves to compress the spring 144 (see Fig. 5) and to store up energy in the same. During the traverse of the portion "g" of the cam the parts are maintained in their operative position, the portion "g" being concentric. In such position, it will be observed, and in fact during the entire welding operation the ends of both electrodes 80 are spaced a short distance apart so that when the welding current is turned on, it flows from one electrode through the metal of the two hub sections to the second electrode.

The cam shaft 122, upon which both controlling cams 120, 121 are mounted, is intermittently driven in timed relation to the movements of the wheel holding jigs from the main driving shaft 50 (see Fig. 13) through spur gears 52, 54, the latter being mounted upon the intermediate shaft 56, and through Geneva gears 57, 59 mounted upon the hub of the gear 54, and the extended end of the cam shaft 122 respectively. The design of the Geneva gears (as illustrated in Fig. 19) is such as to produce revolutions of the cam shaft 122 in timed relation to the movements of the wheel holding jigs.

Referring particularly to Fig. 9, it will be apparent from the foregoing description that during the movement of the electrodes 80 into the position shown in Fig. 9, and in which the inclined shoulder 170 of one electrode holder is brought into engagement with the inclined portion of the hub, and in which the other electrode is brought into its stationary position, the movements of the actuating cams 120, 121 are transmitted from the lower carriages 87 to the upper carriages 84 through coiled springs 92 without substantially compressing the latter. As soon as the parts have attained the above mentioned position, then further movement of the actuating cams 120, 121 operates to cause relative movement between the upper and lower carriages 84, 87, the springs 92 compressing at such time.

Figure 4:
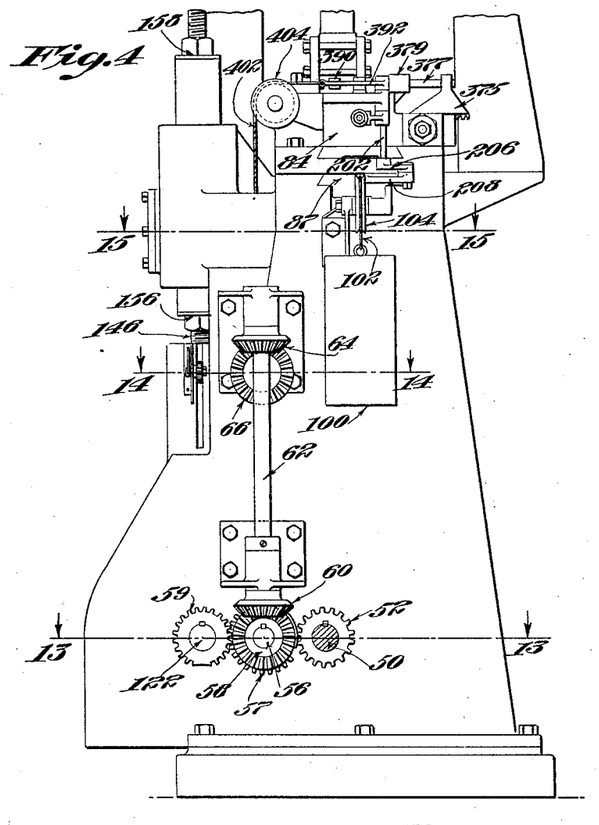
Fig. 4 is a partial right end elevation.
Figure 12:
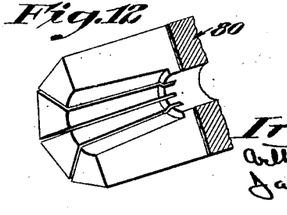
Fig. 12 is a perspective detail of one expanding electrode.

The relative movement between the upper and lower carriages 84, 87 is utilized to expand the internal electrodes 80. Each electrode, as shown in Fig. 12, comprises a plurality of cylindrical segments separated by slots. The internal surfaces of the segments are such as to form a tapered hole in which an expanding cone 180 is received. The expanding cones 180 are formed on the end of rods 182 extended through holes in the electrodes and upper carriages, as shown in Fig. 9. Second rods 184 are connected by insulted couplings 186 to the ends of the rods 182, and coiled springs 188 embrace the outer ends of the rods 184. One end of the coiled springs abut stop collars 190 between which and stop nuts 192, yokes 196 are received. The yokes 196 are formed upon the ends of levers 200, fulcrumed upon pins 202. Nuts 189 on the outer ends of the rods 184 enable adjustment of tension in springs 188. The nuts 192 afford adjustment for the initial position of the expanding cones 180. On the lower end of the pins 202 (see Fig. 4) levers 206 are secured, connected to brackets 208 upon the lower carriages 87. Movement of the lower carriages during the period of relative movement between them and the upper carriages, operates through the linkage just described to move the rods 184 outwardly from each side of the machine, the coiled springs 188 being compressed at such time. In this manner the expanding cones 180 are drawn into the tapered holes within the electrodes 80 and operate to expand them tightly against the interior of the hubs.

Figure 5:
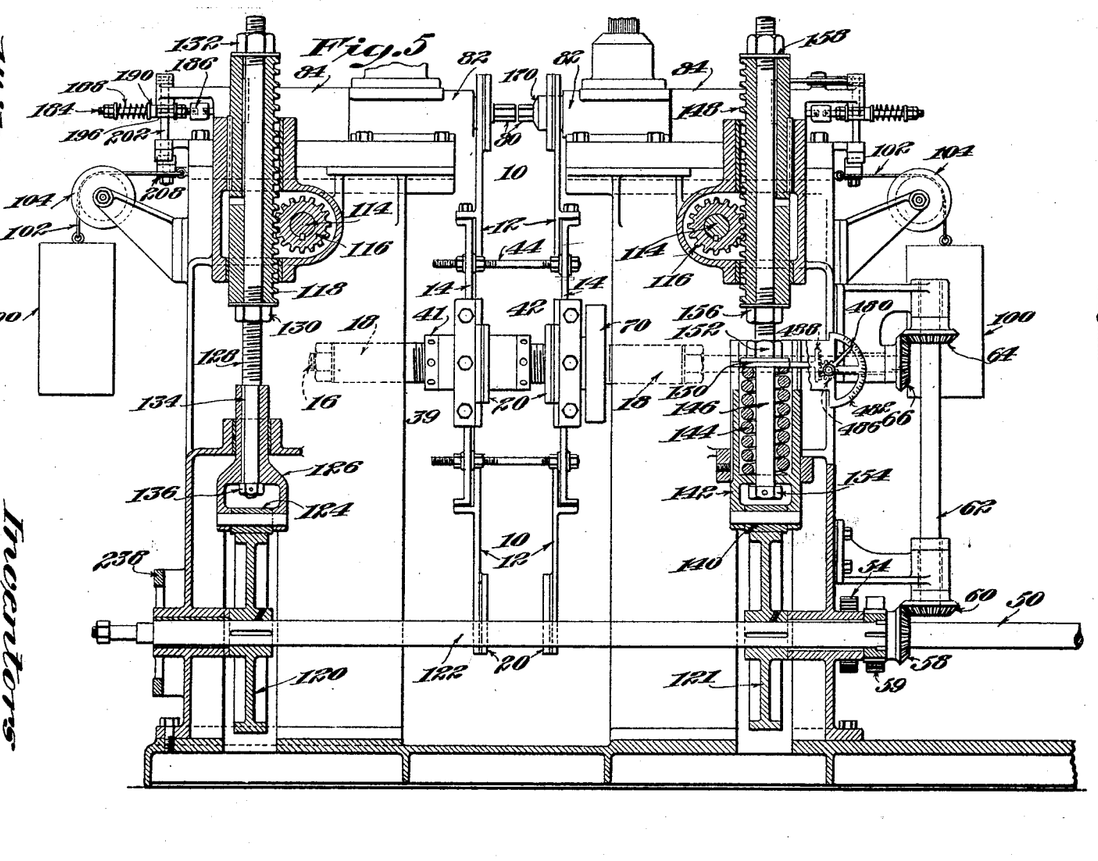
Fig. 5 is a vertical longitudinal sectional elevation of the machine.

After the electrodes 80 have been expanded against the interior of the hubs, provision is made for automatically turning on the welding current at this time, and for this purpose an automatic commutator 83 is mounted upon one end of the cam shaft 122, as shown in Figs. 1 and 5. The commutator comprises copper and fibre segments 220, 222, secured to and insulated from the cam shaft. Two brushes 224, 226, preferably of carbon, cooperate with the segments. The brush 224 is stationary, being mounted in a bracket 230 affixed to a segmental bracket 232, itself bolted to a portion 238 of the frame, as shown in Fig. 5. The second brush 226 is adjustable, being mounted in a movable bracket 240 arranged to swing about the segmental bracket 232.

A clamping bolt 242 serves to secure the movable brush in any desired position of adjustment. It will be observed that the time at which the current is cut off from the electrodes in relation to their operating cams 120, 121, may be varied by movement of the adjustable brush 226. The time at which the current comes on, however, is always the same, being controlled by the stationary brush 224. In this manner it will be observed after the electrodes 80 have been expanded the welding current is immediately turned on.

Figure 8:
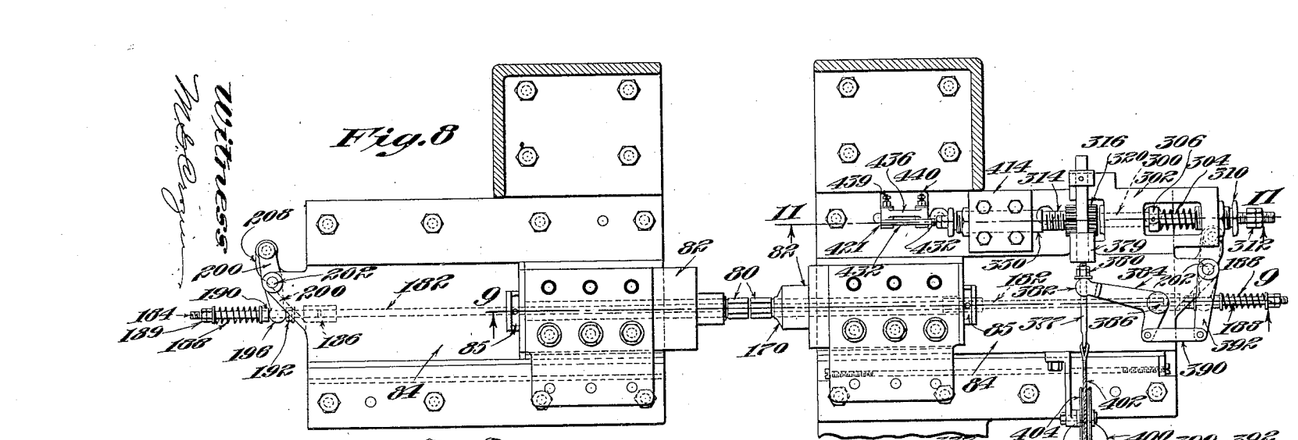
Fig. 8 is a plan view of the electrode holders and compensating mechanism.
Figure 11:
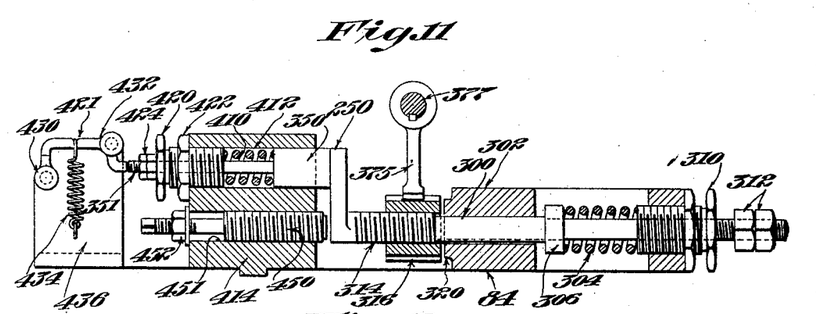
Fig. 11 is a sectional detail of the compensating mechanism on the line 11—11 of Fig. 8.

After the welding current has been turned on in the manner described, the temperature of the metal of the hub sections to be welded gradually rises, and when the metal has become sufficiently heated to flow, provision is made for upturning the desired flash. Referring to Figs. 8, 9 and 11, the relative movement between the right hand lower carriage 87 and upper carriage 84 is utilized not only to expand the electrode 80 but also to prepare and operate a compensating mechanism by which variations in the length of the hub sections are taken care of to the end that a welded hub of standard length may be produced. For this purpose a rod 300 is extended through a yoke 302 projecting from the side of the upper carriage 84, as shown in Fig. 8. The rod 300 is normally urged inwardly by a coiled spring 304 embracing the rod and one end of which abuts a stop collar 306 pinned to the rod, and the second end thereof abuts an adjustable screw 310. Stop nuts 312 serve to limit the inward movement of the rod. An abutment arm 250 upon the end of the rod 300 is yieldingly held against a plunger 350 (see Fig. 11) during the relative movement of the carriages. The plunger 350 slides in a cylindrical hole 412 in a bearing block 414 bolted upon the top of the machine frame in the position shown in Fig. 8. The plunger 350 is normally maintained in an extended position by a heavy coiled spring 410 adjustably maintained under compression by an adjusting screw 420 held in adjusted position by a lock nut 422. Stop nuts 424 upon the end of the plunger stem 351 serve to limit the outward movement of the plunger. A portion 314 of the rod 300 is threaded and a pinion nut 316 is screwed thereon, being adapted when turned down to abut a surface 320 upon the end of the yoke 302. The pinion nut 316 is rotated with relation to the threaded portion of the rod by mechanism actuated by the relative movement of the carriages 84, 87. Such mechanism includes a rack 375 secured to a rod 377 slidably received in a bearing member 379 extended upwardly from the top of the yoke 302. The rod 377 is provided with adjustable stop nuts 380, and a yoke 382 formed upon the end of a bell crank 384, pivoted at 386 upon the upper carriage 84, embraces the portion of the rod beyond the stop nuts 380. One arm of the bell crank 384 is connected by a link 390 to one end of a lever 392 pivoted upon the fulcrum rod 202 (see Figs. 4 and 8). The relative movement of the upper and lower carriages as has been described in connection with the expansion of the electrodes 80, operates to rock the fulcrum rod 202 and consequently to swing the lever 392 outwardly. In this manner the bell crank 384 is oscillated upon its pivot thus withdrawing the yoke 382 from engagement with the stop nuts 380 and permitting a weight 400 connected by a cable 402 over an idler pulley 404 to the end of the rod 377 to pull the rod outwardly and thereby through the rack 375 to screw down the pinion nut 316 into engagement with the shoulder or surface 320. The position of the pinion nut 316 is initially adjusted upon the threaded portion 314 of the rod 300 so that with hub sections of standard length the travel imparted to the rack 375 by the relative movement of the upper and lower carriages is sufficient to screw down the pinion nut against the shoulder 320. Thereafter when the portions of the hub to be welded attain welding temperature, the expansive force in the coiled spring 144 operates through the carriages to move the rod 300 until the end thereof strikes an adjusting screw 450, the movements of the parts at such time forming the flash. The adjusting screw 450 is screwed into a threaded hole 451 in the lower portion of the block 414. The adjustment of the screw 450 may be conveniently effected by a wrench or other tool inserted over the squared end of the reduced end portion of the screw 450. The set nut 452 is provided to maintain the screw 450 in adjusted position. During the movement of the rod 300 in forming the flash, the abutment arm 250 operates to move the plunger 350 inwardly, compressing the coiled spring 410 and operating a cut off switch 421 to cut off the welding current.

In the event that the lengths of the hub sections are greater than the standard length, then in the movement of the carriages 84, 87 inwardly, the shoulder 170 upon the end of the electrode holder 82 is brought up against the inclined portion of the hub at an earlier point in the inward travel of the carriages, so that the position of the rod 300 with respect to the yoke 302 upon the upper carriage, is at the start of the relative movement between the carriages, farther to the left (viewing Fig. 11) than would be the case were hub sections of normal or standard length to be welded, so that the pinion nut 316 after having been screwed down by the action of the rack 375 during the relative movement of the carriages, is still separated from the shoulder 320 by a short space, depending upon the increased length of the hub sections over their normal or standard length. The parts remain in such position until the metal reaches welding temperature at which time the upper carriage is moved inwardly under the expansion of the heavy coiled spring 144 and until the shoulder 320 upon the yoke 302 is brought into abutment with the pinion nut 316. Thereafter the movement of the upper carriage continues under the expansion of the coiled spring 144 until the end of the rod 300 brings up against the end of the adjusting screw 450, the plunger 350 moving inwardly, compressing the coiled spring 410 (which is lighter than the coiled spring 144) and operating to open the cut off switch 421 to cut off the welding current. It will be observed that when long hub sections are to be welded a flash of increased height is turned up thus enabling the length of the welded hub to be maintained a standard amount. On the other hand, when hub sections below the standard length are encountered the inclined shoulder 170 finds the inclined portion of the hub at a time later in the inward travel of the carriages with the result that the rod 300 is positioned at the start of the relative movement between the carriages, farther to the right with relation to the upper carriage than in the case of the hub sections of standard length, the increased strength of the coiled spring 410 operating to move the rod 300 outwardly with relation to the yoke 302, the coiled spring 304 compressing at such time, so that during the relative movement of the carriages the pinion nut 316 is screwed down against the shoulder 320. When, therefore, the welding temperature in the metal is attained, the rod 300 is moved along with the carriages under the influence of the expansion of the coiled spring 144 until the end of the rod is brought up against the end of the adjusting screw 450, so that in this manner the length of the welded hub is retained at a standard amount. It will be observed that in the case of hub sections below standard length the flash turned up is of less height than the standard flash. In practice the variations in the lengths of the hub sections are relatively small so that in any event a strong and durable weld is obtained.

Figure 14:
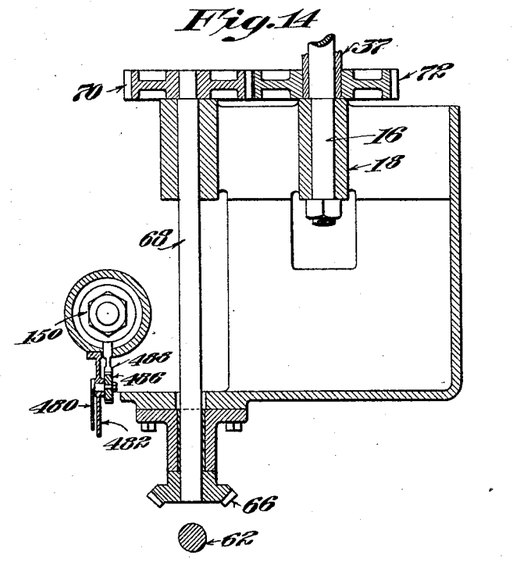
Fig. 14 is a sectional detail through drum drive taken on the line 14—14 of Fig. 4.

In order to afford visible indication of the amount of pressure exerted by the coiled spring 144 during the final welding operation in which the flash is up-turned, provision is made for indicating this pressure. To this end a pointer 480 is arranged to cooperate with a graduated scale 482, as shown in Figs. 5 and 14. The pointer 480 is actuated through frictional engagement of a pinion 486 actuated by a rack 488, itself moved by the movements of the spring 144 exerted against the washer 150 rigidly connected to the rack. The graduated scale is calibrated to indicate in units of pressure the relative compression or elongation of the spring.

Figure 17:
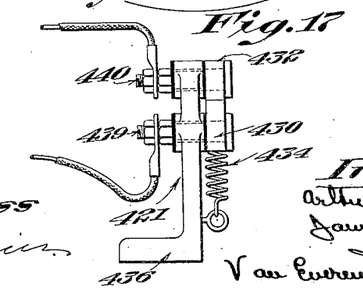
Fig. 17 is a detail of the cut-off switch.
Figure 20:
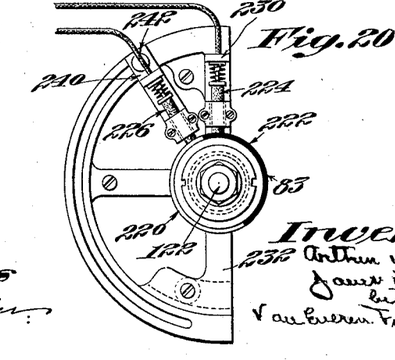
Fig. 20 is a plan view of the timer.

The cut off switch 421 comprises a stationary member 430 and a movable member 432, the latter being yieldingly maintained in contact with the stationary member 430 by a coiled spring 434, as shown in Fig. 11. The stationary and movable members 430, 432 are mounted upon a bracket 436 bolted to the machine frame, and terminal posts 439, 440, connecting the members 430 and 432 are arranged as shown in detail in Fig. 17.

The current for performing the welding operation is supplied from a source of supply (not shown) to the commutator 83 mounted upon the end of the cam shaft 122. From the commutator the current is conducted through a rheostat illustrated diagrammatically at 500 mounted upon the machine frame and by which the amplitude of the current may be adjustably controlled by the operator. From the rheostat 500 the current is led to the primary winding 502 of a transformer, the secondary 504 of which is connected directly to the electrode holders 82, as illustrated diagrammatically in Fig. 1. The cut off switch 421 is interposed into the primary circuit to cut off the welding current in advance of the opening of the circuit by the commutator.

The main driving shaft 50, by which the feeding mechanism for the wheel holding jigs and the electrode operating mechanism are actuated, is itself driven from an electric motor 490 or other source of power through a reducing gear train, illustrated generally by the reference 492. The design of the reducing gear train is preferably that disclosed in my co-pending application for welding machines, filed on even date herewith and to which reference may be had for a more detailed illustration.

In order to start and stop the machine a clutch, indicated generally at 494, is provided, adapted to be operated manually by the lever 496. It is desirable that the clutch should be designed to cause the machine to be stopped at a predetermined position independently of the exact time at which the lever 496 is thrown out. The point in the cycle of operations of the machine at which it is most desirable to stop the machine, is in the position assumed when the electrodes 80 have been fully withdrawn from the hub sections of the wheel and just before the feeding mechanism for the wheel holding jigs commences to present a succeeding wheel holding jig into welding position. The mechanism for actuating the clutch to accomplish this result comprises preferably that disclosed in my co-pending application above referred to and to which reference may be had. Such mechanism comprises in general a cam 499 having a cam surface (not shown) with which a plunger operated by the lever 496 cooperates. The cam 499 is set in timed relation to the cycle of operations of the machine, so that when the lever 496 is thrown out the plunger engages the cam and rides around it until brought up against a cam surface to stop the machine at the desired point in the cycle of operations thereof, namely when the electrodes have been drawn and before a succeeding step in the feeding of the wheel holding jigs.

While the invention has been illustrated and described as embodied in a machine for butt-welding the rims of a steel vehicle wheel, it is to be understood that certain features of the invention may be used to advantage in welding other articles as defined in the following claims.

We claim:

1. A machine for butt welding the hub sections of a vehicle wheel having, in combination, welding electrodes, means for presenting a pair of hub sections to welding position, and electrode operating mechanism for performing the welding operation including expansible electrodes, and means for moving them into the interior of the hub sections and for thereafter expanding the same to internally clamp the hub sections.

2. A machine for butt welding the hub sections of a vehicle wheel having, in combination, welding electrodes, means for presenting a pair of hub sections to welding position, electrode operating mechanism for performing the welding operation, and means for internally clamping the hub sections in welding position.

3. A machine for butt welding the hub sections of a vehicle wheel having, in combination, welding electrodes, a plurality of jigs for holding a plurality of pairs of the hub sections to be welded, means for moving the jigs to present successive portions of the hub sections to welding position, means for internally clamping the hub sections in welding position, and electrode operating mechanism for thereafter performing the welding operation.

4. A machine for butt welding the hub sections of a vehicle wheel having, in combination, welding electrodes spaced apart, a plurality of jigs for holding a plurality of pairs of hub sections, means for moving successive jigs to a position between the electrodes, devices for internally clamping the hub sections while in welding position, and means operating in timed relation to the movements of said jigs for performing the welding operation.

5. A machine for butt welding the hub sections of a vehicle wheel having, in combination, welding electrodes spaced apart, means for holding a plurality of pairs of the hub sections to be welded, means for vertically rotating said holding means to present successive hub sections to welding position between the electrodes, means for internally clamping the hub sections in welding position, and means operating in timed relation to the movements of the wheel holding means for performing the welding operation.

6. A machine for butt welding the hub sections of a vehicle wheel comprising means for holding two hub sections with their inner ends in abutting relation, two electrodes positioned within the abutting hub sections and separated from one another, means for expanding the electrodes to cause each electrode to grip the hub section within which it is positioned, and means for passing welding current through the electrodes and the metal of the hub sections therebetween.

7. A machine for butt welding the hub sections of a vehicle wheel having, in combination, a frame, welding electrodes mounted thereon comprising two pairs of superposed carriages and expansible clamping means mounted upon the upper thereof, means for relatively moving the two sets of carriages to cause the clamping means to enter the interior of the hub sections and to move the hub sections into an abutting position, means for expanding said clamping means, means for turning on the welding current, and means for cutting off the welding current when the weld is formed.

8. A machine for butt welding the hub sections of a vehicle wheel having, in combination, a frame, electrodes mounted thereon, one electrode comprising superposed carriages, means for moving said carriages to cause a portion of one thereof to engage one of the hub sections and to move it into abutting position with relation to the second hub section, means for exerting a yielding pressure upon said carriage during the welding operation, and means actuated by movement of said carriage when the weld is formed for cutting off the welding current.

9. A machine for butt welding the ends of hollow tubular members comprising means for holding the members to be welded with their ends in abutting relation, two internal electrodes positioned within the members to be welded and spaced from one another, means for expanding the electrodes against the members, and means for passing a welding current through the electrodes and the metal of the members therebetween.

10. A machine for butt welding the hub sections of a vehicle wheel having, in combination, a frame, welding electrodes spaced apart and movably mounted in the frame, electrodes operating mechanism including a pair of superposed carriages, one of which carries an electrode, means for relatively moving the carriages after the welding current has been turned on, and means actuated by such relative movement for compensating for variations in the lengths of the hub sections from a standard whereby welded hubs of uniform length are produced.

11. A machine for butt welding the hub sections of a vehicle wheel, having, in combination, a frame, welding electrodes spaced apart and movably mounted in the frame, electrodes operating mechanism including a pair of superposed carriages, one of which carries an electrode, means for relatively moving the carriages after the welding current has been turned on, and means actuated by such relative movement for compensating for variations in the lengths of the hub sections from a standard whereby welded hubs of uniform length are produced, said means including a rod mounted to move with one of the carriages, a knife switch arranged to be actuated by movement of the rod beyond a definite point, and means for relatively shifting the position of the rod and carriage according to variations in the length of the hub sections to be welded.

12. A machine for butt welding the hub sections of a vehicle wheel having, in combination, welding electrodes, means for presenting a pair of hub sections to welding position, means for internally clamping the hub sections in welding position, and means for compensating during the welding operation for variations in the lengths of the hub sections from a standard.

13. In a machine for butt welding the hub sections of a vehicle wheel, the combination of welding electrodes, and means for presenting successive pairs of hub sections to welding position including a frame, supporting members rotatably mounted in the frame, a plurality of jigs carried by the supporting members for holding successive pairs of hub sections, and means for intermittently rotating the supporting members.

14. In a machine for butt welding the hub sections of a vehicle wheel, the combination of welding electrodes, and means for presenting successive pairs of hub sections to welding position including a plurality of jigs for supporting successive pairs of hub sections provided with collars in which the ends of the hub sections are received, positioning pins cooperating with the spokes of the hub sections and adjusting bolts for vertically positioning the hub sections with relation to one another.

15. In a machine for butt welding the hub sections of a vehicle wheel, the combination of a frame, welding electrodes mounted thereon and capable of relative movement, clamping devices for engaging the hub sections presented to a position between the electrodes, and means actuated by relative movement of the electrodes for operating the clamping devices.

16. In a machine for butt welding the hub sections of a vehicle wheel, the combination of a frame, electrodes mounted thereon, clamping devices for internally engaging the hub sections and mechanism for relatively moving the electrodes into engagement with the hub sections and for operating the clamping devices.

17. In a machine for butt welding the hub sections of a vehicle wheel, the combination of a frame, electrodes mounted thereon, clamping devices for internally engaging the hub sections and mechanism for relatively moving the electrodes into engagement with the hub sections and for operating the clamping devices, said mechanism including a carriage upon which one electrode is mounted, a second carriage upon which the first carriage slides, means for moving the carriages in unison until the hub sections are brought in abutment and for thereafter permitting relative movement between the carriages, and means actuated by the relative movement for operating the clamping devices.

18. In a machine for butt welding the hub sections of a vehicle wheel, the combination of a frame, welding electrodes mounted thereon, means for presenting a pair of hub sections to a position between the electrodes, each electrode having an expansible end portion adapted upon relative movement of the electrodes to enter the interior of the hub sections, means for relatively moving the electrodes, and means for expanding the end portions of the electrodes to internally clamp the hub sections.

19. In a machine for butt welding the hub sections of a vehicle wheel, the combination of a frame, welding electrodes mounted thereon, means for presenting a pair of hub sections to a position between the electrodes, each electrode having an expansible end portion adapted upon relative movement of the electrodes to enter the interior of the hub sections, means for relatively moving the electrodes, means for expanding the end portions of the electrodes to internally clamp the hub sections, and means for clamping the hub sections longitudinally.

20. In a machine for butt welding the hub sections of a vehicle wheel, the combination of a frame, welding electrodes mounted thereon, means for automatically presenting successive pairs of hub sections to a position between the electrodes, and means for moving the electrodes into engagement with the hub sections including a shaft driven in timed relation to the movements of the hub sections into welding position, and connections between the shaft and each electrode arranged to move one of the electrodes to a predetermined position and to move the other electrode toward the first electrode until the hub sections are engaged by both electrodes.

21. In a machine for butt welding the hub sections of a vehicle wheel, the combination of a frame, welding electrodes mounted thereon and capable of relative movement, means for presenting a pair of hub sections to a position between the electrodes, means for relatively moving the hub sections after welding temperature is attained to form a welded hub and means for determining the movement of the hub sections during the welding operation to form a hub of a standard length irrespective of variations in the original lengths of the hub sections.

22. In a machine for butt welding the hub sections of a vehicle wheel, the combination of a frame, welding electrodes mounted thereon and capable of relative movement, means for presenting a pair of hub sections to a position between the electrodes, and means for forming a welded hub of standard length irrespective of variations in the original lengths of the hub sections.

23. In a machine for butt welding the hub sections of a vehicle wheel, the combination of a frame, welding electrodes mounted thereon and capable of relative movement to form a flash, means for presenting a pair of hub sections to a position between the electrodes, and means for forming a welded hub of standard length irrespective of variations in the lengths of the hub sections, said means including mechanism for controlling the height of the flash directly in accordance with variations in the lengths of the hub sections from a standard.

24. In a machine for butt welding the hub sections of a vehicle wheel, the combination of a frame, electrodes spaced apart and mounted upon the frame, a movable carriage in which one electrode is mounted, a second carriage for moving the first carriage and capable of relative movement with relation thereto when the electrode has been moved into operative engagement with the hub sections to form a flash, and means controlled by the time of engagement of the electrode with the hub sections for controlling the height of the flash formed during the welding operation directly in accordance with variations in the lengths of the hub sections from a standard.

25. In a machine for butt welding the hub sections of a vehicle wheel, the combination of a frame, welding electrodes mounted thereon, means for positioning a pair of hub sections between the electrodes, and means for performing the welding operation including a pair of superposed carriages in the upper of which one electrode is mounted, means for moving the carriages until the hub sections are brought into abutment, and for thereafter relatively moving the lower carriage with relation to the upper carriage, and mechanism for compensating for variations in the length of the individual hub sections from a standard including means carried by the upper carriage and arranged to be moved with relation thereto in accordance with the position in the travel of the upper carriage at which the hub sections are brought into abutment, so that when welding temperature is attained a flash is formed of a height proportionate to variations in the hub sections from a standard.

26. In a machine for butt welding the hub sections of a vehicle wheel, the combination of a frame, two welding electrodes mounted thereon, means for positioning a pair of hub sections between the electrodes, means for forcing the hub sections into abutting position including two carriages movably mounted upon the frame and capable of relative movement, means for moving the carriages as a unit until the upper engages a hub section and forces the latter into abutment with the second hub section and for thereafter relatively moving said carriages, a cut off switch for cutting off the welding current, a member arranged when moved to operate the cut off switch, a second member arranged to be engaged by the upper carriage to transmit the motion thereof to said first member to operate the cut off switch, and connections between the second member and the lower carriage arranged to adjustably position said second member with relation to the upper carriage directly in accordance with the variations in the lengths of the hub sections from a standard.

27. In a machine for butt welding the hub sections of a vehicle wheel, the combination of a frame, two welding electrodes mounted thereon, means for positioning a pair of hub sections between the electrodes, means for forcing the hub sections into abutting position including two carriages movably mounted upon the frame and capable of relative movement, means for moving the carriages as a unit until the upper carriage engages a hub section and forces the latter into abutment with the second hub section and for thereafter relatively moving said carriages, a cut off switch for cutting off the welding current, a rod arranged when moved to operate the cut off switch, a nut movably mounted upon the rod and adapted to be engaged by the upper carriage upon movement thereof in forming the weld, and means actuated by the relative movement of the carriages for adjustably positioning the nut upon the rod with relation to the upper carriage to compensate for variations in the lengths of the hub sections from a standard.

28. In a machine for butt welding the hub sections of a vehicle wheel, the combination of welding electrodes, means for presenting hub sections in welding position, and means for forming a welded hub of standard length irrespective of variations in the original lengths of the hub sections.

ARTHUR M. STANLEY.
JAMES E. SIMS.